United States Patent [19]

Serini et al.

[11] Patent Number: 4,564,654

[45] Date of Patent: Jan. 14, 1986

[54] PROCESS FOR THE PREPARATION AND/OR FURTHER PROCESSING OF POLYMER BLENDS

[75] Inventors: Volker Serini, Krefeld; Christian Lindner, Cologne; Horst Peters, Leverkusen; Wolfgang Nising, St. Augustin, all of Fed. Rep. of Germany

[73] Assignee: Bayer Aktiengesellschaft, Leverkusen-Bayerwerk, Fed. Rep. of Germany

[21] Appl. No.: 674,846

[22] Filed: Nov. 26, 1984

[30] Foreign Application Priority Data

Dec. 7, 1983 [DE] Fed. Rep. of Germany ....... 3344102

[51] Int. Cl.$^4$ .................. C08L 51/04; C08L 69/00
[52] U.S. Cl. ..................... 525/67; 126/361; 264/328.1; 264/331.13; 264/331.16; 525/146; 525/147; 525/148
[58] Field of Search ............... 525/67, 146, 147, 148, 525/468; 264/319, 328.1, 331.13, 331.16

[56] References Cited

U.S. PATENT DOCUMENTS

| Re. 31,165 | 3/1983 | Serini et al. | 525/147 |
| 4,172,103 | 10/1979 | Serini et al. | 525/76 |
| 4,409,363 | 10/1983 | Brandstetter et al. | 525/146 |
| 4,463,130 | 7/1984 | Serini et al. | 525/146 |

FOREIGN PATENT DOCUMENTS 0012357 6/1980 European Pat. Off.
2118194 10/1983 United Kingdom.

*Primary Examiner*—Theodore E. Pertilla
*Attorney, Agent, or Firm*—Connolly and Hutz

[57] ABSTRACT

The present invention relates to a process for the preparation and/or further processing of polymer blends of thermoplastic, aromatic tetramethylbisphenol F-containing polycarbonates with styrene/acrylonitrile copolymers and/or with styrene/acrylonitrile graft polymers on special rubbers.

13 Claims, No Drawings

PROCESS FOR THE PREPARATION AND/OR FURTHER PROCESSING OF POLYMER BLENDS

Blends of styrene/acrylonitrile polymers with polycarbonates based on tetra-alkylated diphenols are known. (See, for example, DE-OS (German Published Application) No. 2,329,585, DE-OS (German Published Specification) No. 2,329,646 and DE-OS (German Published Specification) No. 3,118,861). Although such blends containing styrene/acrylonitrile copolymers exhibit a certain degree of compatibility, they form separate phases at room temperature and also in the molten state when commercial styrene/acrylonitrile copolymers whose styrene/acrylonitrile ratio is not more than about 75% by weight:25% by weight are used.

The same applies to mixtures of these polycarbonates with the corresponding styrene/acrylonitrile graft polymers on rubbers, whose styrene/acrylonitrile ratio is, as stated above, likewise about 75:25 (also see G. Humme, H. Röhr and V. Serini, Angew, Makrom. Chem. 58/59 (1977), 85–94).

Blends of this type are prepared at temperatures of up to 260° C. (or up to 250° C.) [see DE-OS (German Published Specification) No. 2,329,646, page 20, and DE-OS (German Published Specification) No. 2,329,585, page 12].

In contrast, blends of tetramethylbisphenol A polycarbonates with polystyrenes exhibit completely different behaviour, since they form single-phase mixtures at temperatures up to about 240° C. in all weight ratios; however, these mixtures separate into two phases above this temperature (R. Casper and L. Morbitzer, Angew. Makrom. Chem. 58/59 (1977) 1–35).

A higher mixing temperature was therefore not advisable for the preparation of such single-phase mixtures of tetramethylbisphenol A polycarbonates with polystyrenes, since subsequent cooling takes place too rapidly for the formation of the stable single-phase state.

Blends of tetramethylbisphenol F-containing polycarbonates cannot in general be mixed with polystyrene to give a single phase. For this system, the choice of mixing temperature is therefore not associated with the above problems.

It has now been found that, by incorporating small amounts (1.5 to 15% by weight) of acrylonitrile into the styrene polymers, miscibility with the tetramethylbisphenol F-containing polycarbonates under discussion is achieved, and is retained even above the mixing temperatures employed in the German Offenlegungsschriften (German Published Specifications) mentioned at the outset; in view of the fact that the above, comparable single-phase mixtures of polystyrene and tetramethylbisphenol A polycarbonates tend to separate, this was not to be expected. Thus, it is possible to prepare and to process single-phase mixtures of the stated type at relatively high temperatures.

The present invention therefore relates to a process for the preparation of polymer blends of A-1 to 99% by weight of a thermoplastic aromatic tetramethylbisphenol F-containing polycarbonate with B-99 to 1% by weight of a styrene/acrylonitrile copolymer and/or with C-99 to 1% by weight of a graft polymer, consisting of 5 to 95% by weight of a styrene/acrylonitrile copolymer and 95 to 5% by weight of a butadiene rubber with 0 to 50% by weight of comonomers in addition to butadiene, of an ethylene/propylene/diene rubber or of a rubber consisting of acrylates with 0 to 30% by weight of other comonomers, prepared by polymerisation of styrene/acrylonitrile blends in the presence of one of the stated rubbers, the sum of the components A+B+C being 100% by weight in each case, which is characterised in that 1. the aromatic polycarbonate (A) contains at least 80% by weight of repeating structural units of the formulae 1 and, if appropriate, 2

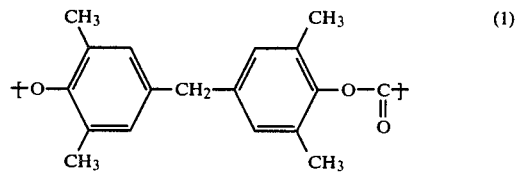 (1)

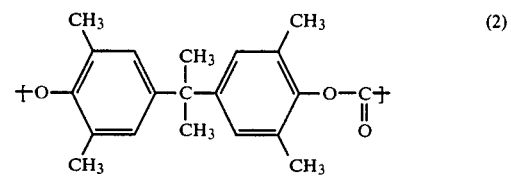 (2)

and not more than 20% by weight of repeating structural units of the formula 3

 (3)

wherein —O—R—O— is another diphenolate radical, and the repeating structural units of the formula 1 must amount to at least 25% by weight of the aromatic polycarbonate, and that 2. the amount of acrylonitrile in the styrene/acrylonitrile copolymer of components B and C is 1.5–15% by weight in each case, and that 3. mixing is carried out at temperatures above 270° C., preferably from 270° to 340° C. and in particular from 280° to 330° C., in extruders or kneaders.

The present invention furthermore relates to a process for the further processing of polymer blends consisting of the abovementioned components A and B and/or C to give shaped articles, which is characterised in that the polymer blends are moulded at temperatures above 270° C., preferably from 270° to 340° C. and in particular from 280° C. to 330° C., in extruders, injection moulding machines or high-temperature presses. A processing of such mixtures, for example the injection moulding of test rods had been previously suggested more for lower temperatures up to a maximum of 260° C. (Compare DE-OS, German Published Application No. 2329585, pages 15 and 21).

The thermoplastic polycarbonates which can be used according to the invention as component A and are based on bis-(3,5-dimethyl-4-hydroxyphenyl)-methane have mean molecular weights $\overline{M}w$ (weight average, determined by the light scattering method) from 10,000 to 200,000, preferably from 20,000 to 80,000 and in particular from 25,000 to 60,000.

In the other carbonate structural units of the structural formula 3

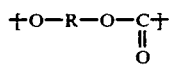

—O—R—O— is a diphenolate radical with the exception of structures 1 and 2, which preferably has 6 to 30 C atoms.

The polycarbonate components A used according to the invention can be branched in a conventional manner by incorporating branching agents.

The preparation of the polycarbonates which can be used according to the invention is known and is described in, for example, the German Offenlegungsschrift (German Published Specification) No. 2,329,585 mentioned at the outset.

Suitable diphenols HO—R—OH (4) other than bis-(4-hydroxy-3,5-dimethylphenyl)-methane and 2,2-bis(4-hydroxy-3,5-dimethyl-phenyl)-propane are, for example, hydroquinone, resorcinol, dihydrodiphenyls, bis-(hydroxyphenyl)-alkanes, bis-hydroxyphenyl)-cycloalkanes, bis-(hydroxyphenyl)ethers, bis-(hydroxyphenyl) ketones and α,α'-bis-(hydroxyphenyl)-diisopropylbenzenes, and their derivatives which are alkylated in the nucleus and halogenated in the nucleus. These and other suitable diphenols are described in, for example, the Monograph by Hermann Schnell, Chemistry and Physics of Polycarbonates, the publication by V. Serini, D. Freitag and H. Vernaleken, Polycarbonate aus o,o-,o',o'-tetramethyl-substituierten Bisphenolen (Polycarbonates from o,o,o',o'-tetramethyl-substituted bisphenols), Angew. Makrom. Chem. 55 (1976), 175–189, and the German Offenlegungsschriften (German Published Specifications) Nos. 2,063,050, 2,211,957, 2,615,038 and 2,248,817.

Preferred other diphenols (4) are 2,2-bis-(4-hydroxyphenyl)-propane, bis-(4-hydroxyphenyl), 1,1-bis-(4-hydroxyphenyl)-cyclohexane, α,α'-bis-(4-hydroxyphenyl)-p-diisopropylbenzene, 2,2-bis-(3-methyl-4-hydroxyphenyl)-propane, 2,2-bis-(4-hydroxy-3,5-dichlorophenyl)-propane, 2,2-bis-(4-hydroxy-3,5-dibromophenyl)-propane and 1,1,2,3,5-pentamethyl-3-(3,5-dimethyl-4-hydroxyphenyl)-indan-5-ol.

The styrene/acrylonitrile copolymers which can be used according to the invention as component B are copolymers which can be prepared by copolymerisation of styrene and acrylonitrile and which contain 1.5 to 15% by weight of acrylonitrile as copolymerised units. The copolymerisation can be carried out by a free-radical method. Preferred styrene/acrylonitrile copolymers contain 6 to 13% by weight of acrylonitrile, particularly preferably 7 to 10% by weight of acrylonitrile.

The molecular weights of these styrene/acrylonitrile copolymers can be varied within wide ranges.

Usually, the molecular weights, expressed as the weight average, should be in the range from 30,000 to 600,000. The non-uniformity of the molecular weight of the styrene/acrylonitrile copolymers, expressed by the value $$\frac{\overline{M_w}}{\overline{M_n}} - 1 = U_n,$$

is not critical. It is usually in the range from $U_n = 0.5$ to 3.5, and can be varied by the preparation process and the preparation conditions.

The styrene/acrylonitrile copolymers can be prepared in principle by known processes, such as, for example, by mass, solution, suspension or emulsion polymerisation, and of course the process conditions which have to be maintained are those which are required for the copolymerisation of the monomers styrene and acrylonitrile to form styrene/acrylonitrile copolymers containing 1.5 to 15% by weight of acrylonitrile as copolymerised units. Preferred methods of preparation are emulsion, solution and mass copolymerisation. The copolymerisation can be carried out batchwise or continuously. The continuous reaction procedure is particularly advantageous.

The styrene/acrylonitrile copolymers which can be used according to the invention generally possess a linear, non-crosslinked structure. However, the polymer blends according to the invention can also be prepared using styrene/acrylonitrile copolymers possessing a branched structure.

The graft polymers which can be used according to the invention as component C are graft polymers consisting of 10 to 95% by weight of a styrene/acrylonitrile copolymer and 90 to 5% by weight of a rubber. The styrene/acrylonitrile copolymer contains 1.5 to 15% by weight of acrylonitrile, preferably 6 to 13% by weight of acrylonitrile and in particular 7 to 10% by weight of acrylonitrile, as copolymerised units. The graft polymer is preferably obtained by free radical copolymerisation of the graft monomers styrene and acrylonitrile in the presence of the rubber which constitutes the grafting base. The rubber which serves as the grafting base can be a butadiene rubber prepared from butadiene with up to 50% by weight of comonomers. Preferred rubbers of this type are butadiene/styrene and butadiene/acrylonitrile copolymers, and in particular polybutadiene. Other rubbers which can be employed as a grafting base are rubber-like acrylate copolymers and EPDM terpolymers.

The graft polymerisation of the monomers styrene and acrylonitrile on to the rubber should be carried out by conventional methods, so that the resin component of the graft polymers has the desired styrene/acrylonitrile ratio within the range of the styrene/acrylonitrile ratios according to the invention. Preferred graft polymers contain 65 to 90% by weight of rubber and 35 to 10% by weight of styrene/acrylonitrile copolymer. Other preferred graft polymers contain 15 to 50% by weight of rubber and 85 to 50% by weight of styrene/acrylonitrile copolymer.

The preparation of the graft polymers which can be used according to the invention is known. Thus, the graft monomers can be polymerised in the presence of a latex of the grafting base in an emulsion with free radical initiators. If the grafting base is partially crosslinked and certain graft monomer/grafting base ratios are maintained, the particle size of the latex of the grafting base also determines the size of the graft rubber particles. The graft shell consists of chains of the polymer of the graft monomers, which chains are bonded chemically to the rubber particles. The grafting reaction is incomplete. In addition to the actual graft rubber particles, the ungrafted copolymer of the graft monomers is also formed. In this application, both these together are designated the graft polymer. Graft polymers can also be prepared by mass solution polymerisation or mass suspension polymerisation if a monomer-soluble rubber is used as the the starting material. The size of the graft rubber particles is then fixed by the phase conversion, and can be varied both mechanically by stirring, and by chemically influencing the phase equilibrium (addition of dispersants). In general, particles >1 μm are obtained in this manner.

It is possible to use graft polymers to graft other particles which have a diameter from 0.05 to 10 μm, and a substantial part of the graft monomers can be included as a copolymer in the interior of the graft rubber particles. Particle diameters of from 0.05 to 1.2 μm or 0.05 to 0.6 μm are preferred. It is also possible for several graft polymers which differ from one another to be used simultaneously, it being possible for these graft polymers to differ in, for example, the degree of grafting, the grafting density and the size of the graft rubber particles. For example, a mixture of a graft polymer with graft rubber particles having a $d_{50}$ value of from 0.35 to 10 μm and a graft polymer with graft rubber particles having a mean particle diameter $d_{50}$ of from 0.05 to 0.32 μm, that is to say a so-called bimodal system, is particularly suitable. The particle diameter $d_{50}$ is understood as meaning the mean diameter, above which and below which lie the diameters of 50% of the particles.

The following combinations are particularly suitable for the process, according to the invention, for the preparation or further processing:

1. A polymer combination of 70 to 90% by weight of a polycarbonate listed under A with 30 to 10% by weight of a graft polymer which is listed under C and contains 65 to 90% by weight of rubber and 35 to 10% by weight of styrene/acrylonitrile copolymer.
2. A polymer combination of a polycarbonate listed under A, a styrene/acrylonitrile copolymer listed under B and a graft polymer listed under C, in which A and B each amount to at least 10% by weight, A and B together amount to 65 to 90% by weight and C amounts to 10 to 35% by weight, and in which C consists of 65 to 90% by weight of rubber and 5 to 10% by weight of styrene/acrylonitrile copolymer.
3. A polymer combination of 10 to 60% by weight of a polycarbonate listed under A and 90 to 40% by weight of a styrene/acrylonitrile copolymer listed under B.
4. A polymer combination of 20 to 60% by weight of a polycarbonate listed under A and 80 to 40% by weight of a graft polymer which is listed under C and which contains 15 to 50% by weight of rubber and 85 to 50% by weight of styrene/acrylonitrile copolymer.

The process, according to the invention, for the preparation and/or further processing of the polymer blends consisting of the components A and B, which form a single phase, or of the components A and C, or of the components A, B and C, which have a single-phase thermoplastic polymer matrix, permits rapid but nevertheless reliable preparation of polymer blends or of shaped articles having a good combination of properties, which was not to be expected at the relatively high process temperatures.

The customary additives, reinforcing agents, mould-release agents, stabilisers and others can also be added to the polymer blends prepared according to the invention, before their preparation or before their further processing.

The polymer blends or shaped articles prepared according to the invention are used in a conventional manner for applications in which constant contact with hot aqueous solutions or hot water is to be expected, for example for washing machines, hot-water boilers or tableware. They are also very suitable in the automobile sector, where advantageous fracture behaviour even under extreme conditions is required, for example for dashboards and interior panels. For interior panels, the good foamability and adhesion of polyurethane foams to the polymer blends of this invention are particularly advantageous.

Because of the high surface quality and the low expansion coefficients, the blends are suitable for headlight reflectors.

Polycarbonates A which are preferably used are those which contain at least 90% by weight of repeating bifunctional structural units of the formula 1 and, if appropriate, 2, and particularly preferred polycarbonates are those which contain only bifunctional structural units of the formulae 1 and, if appropriate, 2.

The ratio of structural units of the formula 1 to those of the formula 2 in the polycarbonates which can be used according to the invention is between 25/75% by weight and 100/0% by weight. Ratios of above 50% by weight/50% by weight, particularly preferably of 100/0% by weight are preferred (structural units 1/structural units 2).

EXAMPLES 1 TO 6

Preparation of blends from polycarbonates containing 2,2-bis-(3,5-dimethyl-4-hydroxyphenyl)-methane, and styrene/acrylonitrile copolymers (SAN), as well as styrene/acrylonitrile/butadiene graft copolymers (ABS)

The blends listed in the table were prepared by mixing the polycarbonates and the copolymers in the stated mixing ratio using a twin-screw extruder, at 290° C., via the melt. Test samples were produced from the resulting granules, at 300° C., by means of an injection moulding machine. The granules and the injection-moulded articles were subjected to differential thermal analysis. This showed that only one glass transition temperature $T_g$ is obtained in each case for the SAN-containing, transparent granules and test samples, and that the ABS-containing blends, which are opaque owing to the discrete rubber phase, exhibit only one $T_g$ in each case, in addition to the $T_g$ of the polybutadiene rubber (approx. $-80°$ C.). This implies that the blends or the matrices of the blends constitute a single phase.

The polycarbonates and copolymers employed are characterised as follows:
(1) F 100=2,2-bis-(3,5-dimethyl-4-hydroxyphenyl)-methane polycarbonate, $\eta_{rel}=1.295$ (5 g/l in CH$_2$Cl$_2$).
(2) F 75=Copolycarbonate obtained from bis-(3,5-dimethyl-4-hydroxyphenyl)-methane and 2,2-bis-(3,5-dimethyl-4-hydroxyphenyl)-propane, 75/25 parts by weight, $\eta_{rel}=1.298$, (5 g/l in CH$_2$Cl$_2$).
(3) F 50=As for 2), except that the weight ratio is 50/50, $\eta_{rel}=1.293$ (5 g/l in CH$_2$Cl$_2$).
(4) SAN 10=Copolymer obtained from styrene and acrylonitrile, weight ratio 90/10; $\eta_{rel}=1.463$ (5 g/l in CH$_2$Cl$_2$).
(5) ABS 35/10=Graft polymer of styrene and acrylonitrile in a weight ratio of 90:10 on polybutadiene rubber; proportion of polybutadiene equals 35% by weight of the graft polymer, particle size of the rubber is approx. 0.4 μm.

TABLE

Examples 1 to 6:
Glass transition temperature $T_g$ of polymer blends, blended at 290° C. and processed at 300° C.

| Example | Polycarbonate | Copolymer | Mixing ratio | $T_g$ granules (°C.) | $T_g$ test sample (°C.) |
|---|---|---|---|---|---|
| 1 | F 100 | SAN 10 | 50/50 | 141 | 140 |
| 2 | F 75 | SAN 10 | 50/50 | 143 | 143 |
| 3 | F 50 | SAN 10 | 50/50 | 145 | 144 |
| 4 | F 100 | ABS 35/10 | 50/50 | 151 | 152 |
| 5 | F 75 | ABS 35/10 | 50/50 | 155 | 156 |
| 6 | F 50 | ABS 35/10 | 50/50 | 159 | 159 |

We claim:

1. A process for the production of a polymer blend consisting essentially of

A-1 to 99% by weight of a thermoplastic aromatic tetramethylbisphenol F-containing polycarbonate and a copolymer selected from B-99 to 1% by weight of a styrene/acrylonitrile copolymer or C-99 to 1% by weight of a graft polymer, consisting of 5 to 95% by weight of a styrene/acrylonitrile copolymer and 95 to 5% by weight of a butadiene rubber with 0 to 50% by weight of comonomers in addition to butadiene, of an ethylene/propylene/diene rubber or of a rubber consisting of acrylates with 0 to 30% by weight of other comonomers, prepared by polymerisation of styrene/acrylonitrile blends in the presence of one of the stated rubbers, or combinations thereof, the sum of the components A+B+C being 100% by weight, in which the aromatic polycarbonate (A) contains at least 80% by weight of repeating structural units of the formula (1)

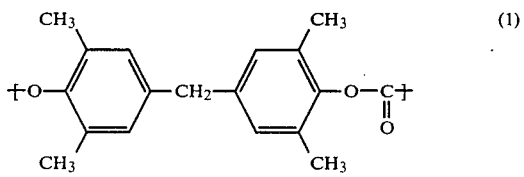

and not more than 20% by weight of repeating structural units of the formula (3)

wherein —O—R—O— is a diphenolate radical, and the repeating structural units of the formula (1) must amount to at least 25% by weight of the aromatic polycarbonate; the amount of acrylonitrile in the styrene/acrylonitrile copolymer of components B and C is 1.5 to 15% by weight; and mixing of the components to form the blend is carried out at a temperature of above 270° C., in an extruder or kneader.

2. A process according to claim 1 in which —O—R—O has 6 to 30 carbon atoms and which is different from formula (1).

3. A process according to claim 1 or 2 in which amount of acrylonitrile in the styrene/acrylonitrile copolymer is 7 to 10% by weight.

4. A process according to any of claims 1 or 2 in which a polymer combination of 70 to 90%, by weight, of a polycarbonate of component A and 30 to 10% by weight of a graft polymer of component C, where the graft polymer contains 65 to 90%, by weight, of rubber and 35 to 10% by weight styrene/acrylonitrile copolymer is mixed.

5. A process according to claims 1 or 2 in which a polymer combination of a polycarbonate of component A, a styrene/acrylonitrile copolymer of component B and a graft copolymer of component C is mixed, in which components A and B each amount to at least 10% by weight, components A and B together amount to 65 to 90% by weight and component C amounts to 10 to 35% by weight, and in which component C contains 65 to 90%, by weight, rubber and 5 to 10%, by weight, styrene/acrylonitrile copolymer.

6. A process according to claims 1 or 2 in which a polymer combination of 10 to 60%, by weight, of a polycarbonate of component A and 90 to 40%, by weight, of a styrene/acrylonitrile copolymer of component B is mixed.

7. A process according to claim 1 in which a polymer combination of 20 to 60%, by weight, of a polycarbonate of component A and 80 to 40% by weight of a graft polymer of component C where the graft polymer, which contains 15 to 50%, by weight, rubber and 85 to 50%, by weight, styrene/acrylonitrile copolymer is mixed.

8. A process according to claims 1 or 2, 7 or 9 in which the mixing is carried out at a temperature of 280° to 330° C.

9. A process according to claim 2 in which a polymer combination of 20 to 60%, by weight, of a polycarbonate of component A and 80 to 40%, by weight, of a graft polymer of component C where the graft polymer, which contains 15 to 50%, by weight, rubber and 85 to 50%, by weight, styrene/acrylonitrile copolymer is mixed.

10. A polymer blend produced by the process of claims 1 or 2, 7 or 9.

11. A process for further processing a polymer blend according to claim 9 to give shaped articles, in which the polymer blend is molded at a temperature above 270° C., in an extruder, injection molding machine or high-temperature press.

12. A shaped article produced by the process of claim 10 which is a washing machine component, a hot-water boiler, tableware or an automobile component.

13. A shaped article according to claim 11 which is an automobile headlight reflector.

* * * * *